(12) United States Patent
Black et al.

(10) Patent No.: US 8,996,805 B2
(45) Date of Patent: Mar. 31, 2015

(54) SHARED CACHE MODULE AND METHOD THEREOF

(75) Inventors: Joseph David Black, Houston, TX (US);
Balaji Natrajan, Spring, TX (US);
Michael G Myrah, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 605 days.

(21) Appl. No.: 13/282,223

(22) Filed: Oct. 26, 2011

(65) Prior Publication Data

US 2013/0111125 A1    May 2, 2013

(51) Int. Cl.
*G06F 13/00*    (2006.01)
*G06F 13/28*    (2006.01)
*G06F 12/08*    (2006.01)

(52) U.S. Cl.
CPC ................................. *G06F 12/084* (2013.01)
USPC ..... 711/114; 711/113; 711/130; 711/E12.019

(58) Field of Classification Search
CPC .................. G06F 12/0866; G06F 2212/314
See application file for complete search history.

(56) References Cited

U.S. PATENT DOCUMENTS

| | | | |
|---|---|---|---|
| 7,249,221 B2 | 7/2007 | Shimada | |
| 7,406,619 B2 | 7/2008 | Lynn | |
| 7,904,647 B2 | 3/2011 | El-Batal et al. | |
| 2010/0312963 A1 | 12/2010 | DeKoning et al. | |
| 2012/0233399 A1* | 9/2012 | Kurokawa et al. | 711/114 |
| 2013/0054883 A1* | 2/2013 | Sihare | 711/105 |

FOREIGN PATENT DOCUMENTS

JP    2004334463    11/2004

* cited by examiner

*Primary Examiner* — Eric S Cardwell
(74) *Attorney, Agent, or Firm* — Hewlett-Packard Patent Department

(57) ABSTRACT

Shared cache modules, systems, and methods are provided herein. The shared cache module is useable with at least one initiator on a serial attached small computer system interface system. The shared cache module includes a memory device and a memory interface. The memory device assigns each of the at least one initiator to a portion of a cache memory on the memory device. The memory interface indexes the assignment and communicates with the at least one initiator to perform a memory task.

19 Claims, 4 Drawing Sheets

SHARED CACHE MODULE AND METHOD THEREOF

BACKGROUND

Disk array controllers manage physical disk drives and present the physical disk drives to a computer as logical units. Disk array controllers typically implement redundant arrays of independent disks (RAID). Disk array controllers also may provide additional disk cache.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Disk array controllers (or array controllers) may or may not have cache memory thereon. Array controllers with cache memory thereon communicate with the cache memory via a local bus. Array controllers without cache memory thereon communicate with the cache memory via a protocol connection, such as a serial attached small computer system interface (SAS) protocol connection in a serial attached small computer system interface (SAS) system.

Shared cache modules, systems, and methods are provided herein. The shared cache module is useable with at least one initiator on a (SAS) system. The shared cache module includes a memory device and a memory interface. The memory device assigns each of the at least one initiator to a portion of a cache memory on the memory device. The memory interface indexes the assignment based on a source address associated with the at least one initiator. The memory interface also communicates with the at least one initiator to perform a memory task. The at least one initiator uses the shared cache module to access memory at run time.

Figure 1:
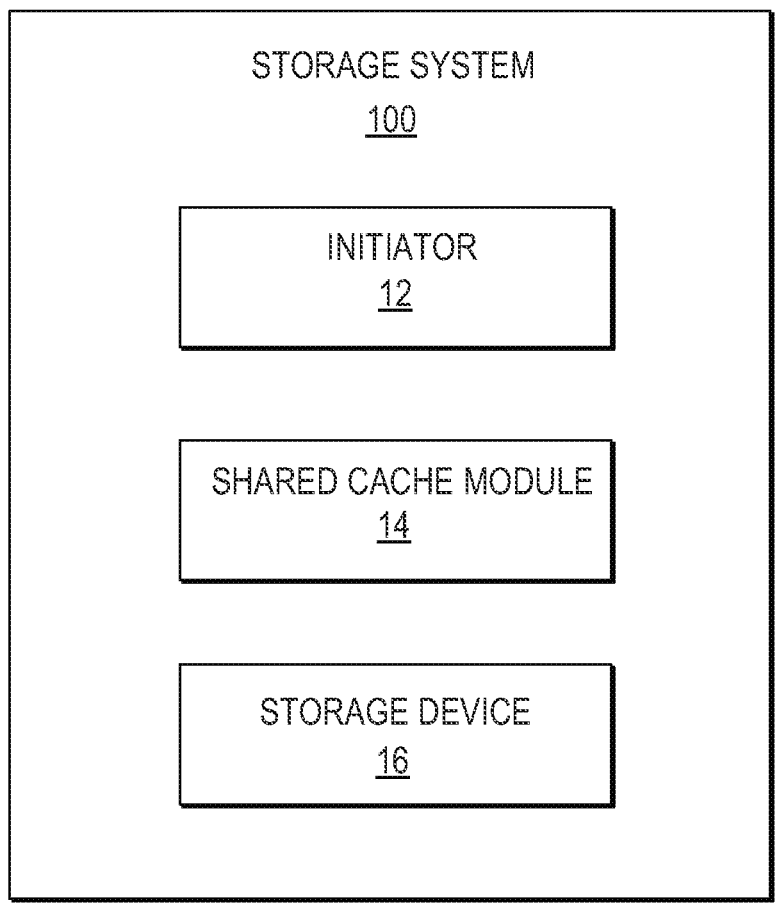
FIG. 1 illustrates a storage system according to an example.

FIG. 1 illustrates a storage system 100 according to an example. The storage system 100 is useable with a SAS system. The storage system 100 includes at least one initiator 12, a shared cache module 14, and a storage device 16. The at least one initiator 12 is an initiator without cache memory on the at least one initiator 12 that is part of the SAS system. The at least one initiator 12 is connected to the storage device 16 via a switch, such as a serial attached small computer system interface (SAS) expander. The shared cache module 14 may be connected to the switch, such that the shared cache module 14 is on a standalone device or attached to the switch.

Figure 2:
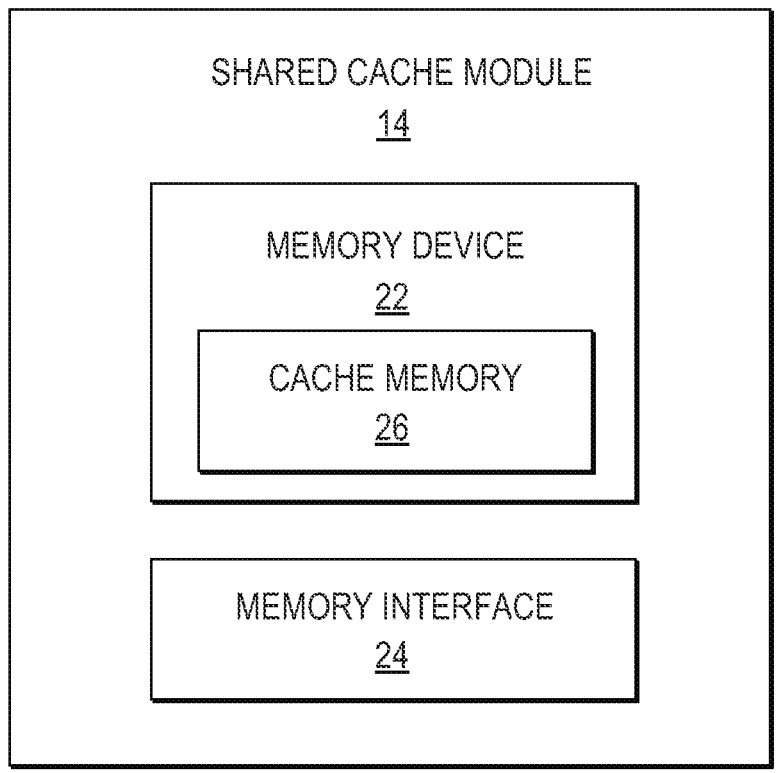
FIG. 2 illustrates a shared cache module according to an example.

FIG. 2 illustrates a shared cache module 14 according to an example. The shared cache module 14 is useable with at least one initiator 12 on a SAS system. The shared cache module 14 enables the at least one initiator 12 to share cache memory. The shared cache module 14 includes a memory device 22 and a memory interface 24. The memory device 22 includes a cache memory 26 and assigns each of the at least one initiator to a portion of the cache memory 26 on the memory device 22. The memory interface 24 indexes the assignment of each of the at least one initiator 12 based on a source address associated with the at least one initiator 12. The memory interface 24 also communicates with the at least one initiator 12 to perform a memory task.

Figure 3:
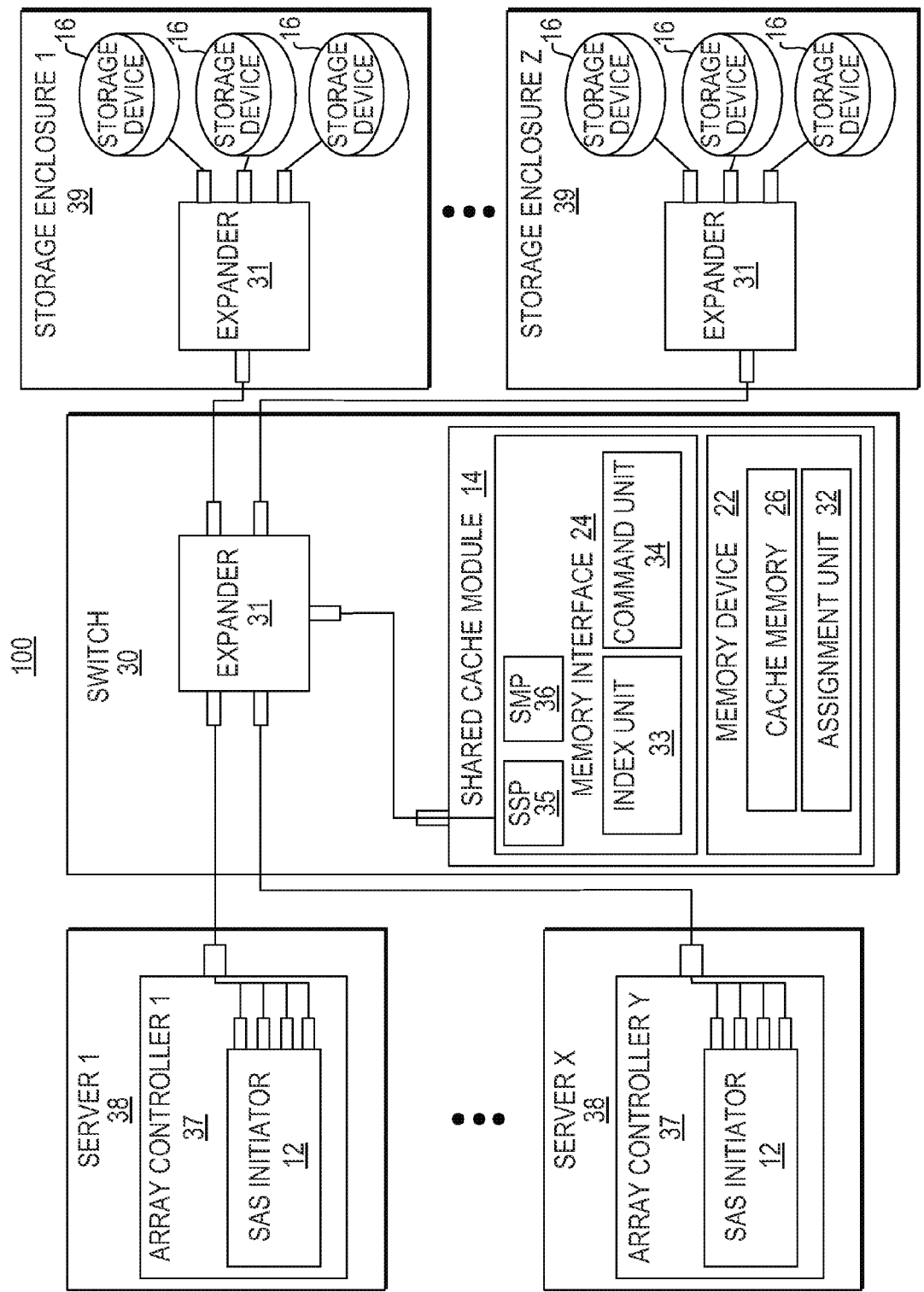
FIG. 3 further illustrates the storage system of FIG. 1 according to an example.

FIG. 3 further illustrates the storage system 100 of FIG. 1 according to an example. The storage system 100 illustrates a switch 30 on a serial attached small computer system interface (SAS) fabric. The switch 30 is connected to the at least one initiator 12 via a SAS protocol connection. The switch 30 is connected to or has an expander 31 thereon. The expander 31 is connected to the at least one initiator 12, such as a serial attached small computer system interface (SAS) initiator. The expander 31 establishes a connection between the at least one initiator 12 and the storage device 16.

The switch 30 may also be connected to or have the shared cache module 14 attached thereon. The shared cache module 14 is connected to the expander 31, such that the shared cache module 14 communicates with the at least one initiator 12 to perform the memory tasks. The shared cache module 14 is connected to the at least one initiator 12 via a SAS protocol connection.

The shared cache module 14 includes a memory device 22. The memory device 22 includes a total amount of cache memory 26. The total amount of cache memory 26 may be classified as one portion and/or divided into multiple portions. The memory device 22 includes an assignment unit 32 that assigns each of the at least one initiator 12 to a portion of the cache memory 26 of the memory device 22. The at least one initiator 12 may be assigned to one portion and/or multiple portions of the cache memory 26 on the memory device 22.

The memory interface 24 also includes an index unit 33 that indexes the assignment of each of the at least one initiator 12 to the portion of the cache memory 26 on the memory device 22. The index is based on a source address corresponding to the at least one initiator 12 and does not require the memory interface 24 to know the offset. The memory interface 24 also includes a command unit 34 that communicates with the at least one initiator 12 to perform the memory task. For example, the command unit 34 receives and interprets commands identifying the memory task.

The memory tasks may include the same commands as used with an initiator with cache memory, such as an array controller having cache memory on the array controller. Examples of the memory tasks are listed as follows. A "READ" or "read data" command returns data to identify the at least one initiator 12, such as a "READ BUFFER" command to identify a "BUFFER ID" or the source address corresponding to the at least one initiator 12. A "WRITE" or "write data" command writes data from the at least one initiator to the memory device 22 that temporarily stores data. A "RAID_OP" or "special operations" command to provide special operations commands to provide instructions to perform a special operation. A "FLUSH" command to flush data from a buffer region to a storage device 16. A "DIAGNOSTICS" command that performs a diagnostic test. A cache administration function, such as an increase size command that increases a size of the portion of the cache memory 26 and a decrease size command that decreases a size of the portion of the cache memory 26. The cache administration function may further be used to replace the at least one initiator 12 associated with a portion of the cache memory 26 without losing data when hardware is replaced, as the shared cache module 14 provides a virtual means to store data.

The memory interface 24 includes at least one port, such as a serial small computer system interface protocol (SSP) port 35 and/or a serial management protocol (SMP) port 36. The SSP and/or SMP ports, for example, connect the shared cache module 14 to the at least one initiator 12 via a SAS protocol connection. The at least one initiator 12 may be connected and/or attached to an array controller 37, such as a zero memory RAID controller (ZMR controller). The array controller 37 may also be part of a server 38. Referring to FIG. 3, the at least one initiator 12 is illustrated as multiple SAS initiators 12.

The number of servers 38, array controllers 37, and initiators 12 may vary. For example, a plurality of servers 38, such as server 1 through server X, may be connected to the switch 30. The servers 38 each include at least one array controller 37, such as array controller 1 through array controller Y. The SAS initiators 12, the array controllers 37, and/or the servers 38 may be connected to a single switch 30 and/or a single expander 31.

The storage device 16 may be connected to an expander 31 that is connected to the switch 30, such that two expanders 31 are connected to one another. The first expander 31 may be on the switch 30 and the second expander 31 may be connected to the switch 30, but outside the switch 30, such that the second expander 31 connects the storage device 16 to the switch 30. Examples of the storage device 16 include a hard disk drive and a tape drive. The storage device 16 refers to one storage device 16 and/or multiple storage devices 16 as illustrated in FIG. 3. Multiple storage devices 16 may form a serial attached small computer system interface (SAS) domain. The storage device(s) 16 and the second expander 31 may be contained within one or multiple storage enclosures 39, such as storage enclosure 1 through storage enclosure Z illustrated in FIG. 3.

Figure 4:
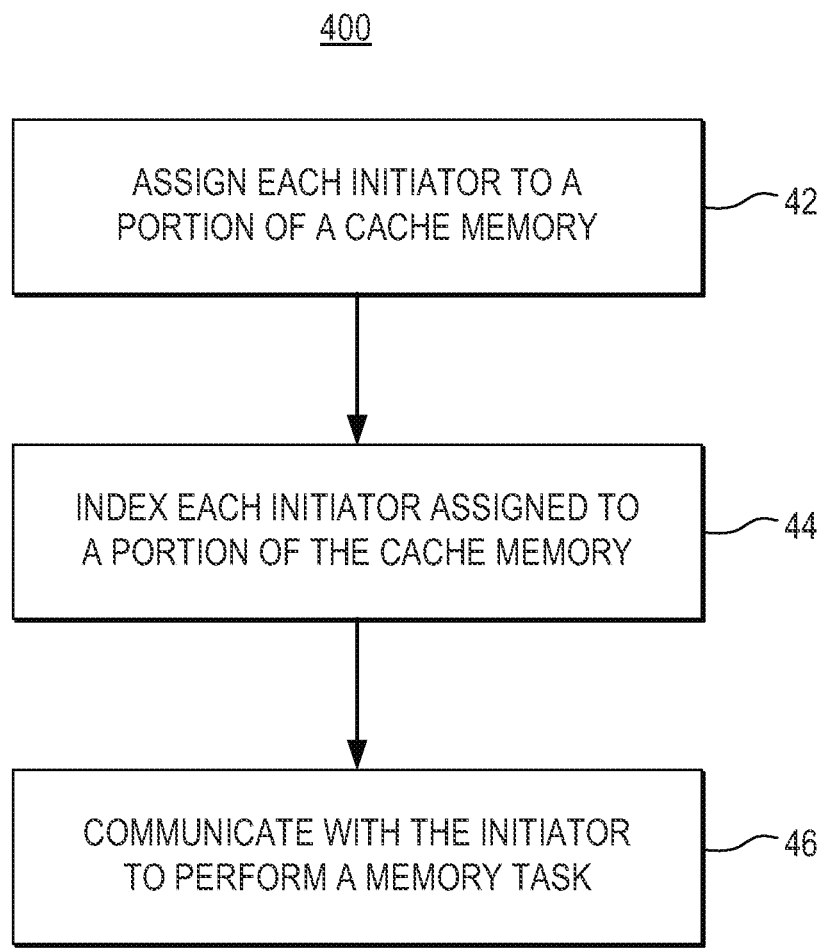
FIG. 4 illustrates a flow chart of a method to utilize a shared cache module according to an example.

FIG. 4 illustrates a flow chart 400 of a method to utilize a shared cache module according to an example. In block 42, the method assigns each of at least one initiator to a portion of a cache memory on the shared cache module. The cache memory is divided into at least one portion dynamically based on at least one of addition and removal of the at least one initiator. For example, a user and/or the switch may control the division of the cache memory. Each of the at least one initiator is assigned to a portion of the cache memory based on a source address associated with the at least one initiator in block 44.

In block 46, the at least one initiator communicates with a shared cache module to perform a memory task. The at least one initiator communicates using a command unit. The command unit receives and interprets commands identifying the memory task. The method 400 further includes the at least one initiator connected to a storage device, such as a hard disk drive or tape drive via at least one expander device.

For example, a memory device includes the cache memory, and the cache memory is attached to the at least one initiator and the storage device. The at least one initiator "caches" a portion of the data on the memory device that has recently been read from or will be stored on the storage device at a later date. Transfers of data and from the memory device to and from the initiator and/or to and from the storage device are performed through the memory tasks, such as READ, WRITE, and/or FLUSH commands described above. Moreover, other memory tasks with instructions to perform other operations that, for example, transform the data in the memory device, such as RAID_OP and DIAGNOSTICS commands, also described above.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A shared cache module useable with at least one initiator on a serial attached small computer system interface system, the shared cache module comprising:
    a memory device to assign each of the at least one initiator to a portion of a cache memory on the memory device, the at least one initiator connected to a switch and a zero memory redundant arrays of independent disks (RAID) controller; and
    a memory interface to:
        index the assignment of each of the at least one initiator based on a source address associated with the at least one initiator, and
        communicate with the at least one initiator to perform a memory task.

2. The shared cache module of claim 1, further comprising an index unit to index the assignment of each of the at least one initiator.

3. The shared cache module of claim 1, further comprising a command unit to communicate with the at least one initiator, the command unit to receive and interpret commands identifying the memory task.

4. The shared cache module of claim 1, wherein the memory interface comprises at least one of a serial small computer system interface protocol (SSP) port and a serial management protocol (SMP) port.

5. The shared cache module of claim 1, wherein the portion of the cache memory comprises at least one portion.

6. The shared cache module of claim 1, wherein the memory task comprises at least one of a return data command to identify the at least one initiator; a write data command to write data from the at least one initiator to the memory device; a special operations command to provide instructions to perform a special operation; a flush data command to flush data from a buffer region to a storage device; a diagnostic command to perform a diagnostic test; an increase size command to increase a size of the portion of the cache memory; and a decrease size command to decrease a size of the portion of the cache memory.

7. A storage system useable with a serial attached small computer system interface system, the storage system comprising:
   at least one initiator connected to a switch, the at least one initiator connected to a zero memory redundant arrays of independent disks (RAID) controller; and
   a shared cache module useable with the at least one initiator on the serial attached small computer system interface system, the shared cache module including:
      a memory device to assign each of the at least one initiator to a portion of a cache memory on the memory device; and
      a memory interface to:
         index the assignment of each of the at least one initiator based on a source address associated with the at least one initiator, and
         communicate with the at least one initiator to perform a memory task.

8. The system of claim 7, wherein the shared cache module further comprises an index unit to index the assignment of each of the at least one initiator.

9. The system of claim 7, wherein the shared cache module further comprises a command unit to communicate with the at least one initiator, the command unit to receive and interpret commands identifying the memory task.

10. The system of claim 7, wherein the memory task comprises at least one of a return data command to identify the at least one initiator; a write data command to write data from the at least one initiator to the memory device; a special operations command to provide instructions to perform a special operation; a flush data command to flush data from a buffer region to a storage device; a diagnostic command to perform a diagnostic test; an increase size command to increase a size of the portion of the cache memory; and a decrease size command to decrease a size of the portion of the cache memory.

11. The system of claim 7, further comprising an expander device to establish a connection between the at least one initiator and a storage device.

12. The system of claim 11, wherein the storage device comprises at least one of a hard disk drive and a tape drive.

13. The system of claim 7, wherein the switch is connected to the at least one initiator via a serial attached small computer system interface protocol connection.

14. The system of claim 7, wherein the shared cache module is a standalone device.

15. The system of claim 7, wherein the shared cache module is connected to the at least one initiator via a serial attached small computer system interface protocol connection.

16. A method to utilize a shared cache module, the method comprising:
   assigning each of at least one initiator to a portion of a cache memory on the shared cache module, the at least one initiator connected to a switch and a zero memory redundant arrays of independent disks (RAID) controller;
   indexing each of the at least one initiator assigned to a portion of the cache memory based on a source address associated with the at least one initiator; and
   communicating with the at least one initiator to perform a memory task.

17. The method of claim 16, further comprising connecting the at least one initiator to a storage device via an expander device.

18. The method of claim 16, further comprising communicating with the at least one initiator using a command unit, the command unit to receive and interpret commands identifying the memory task.

19. The method of claim 16, further comprising dividing the cache memory into at least one portion dynamically based on addition and removal of the at least one initiator.

* * * * *